United States Patent
Hatton

[19]

[11] Patent Number: 6,135,418
[45] Date of Patent: Oct. 24, 2000

[54] LOW-LEAKAGE AIR VALVE FOR VARIABLE AIR INTAKE SYSTEM

[75] Inventor: Bruce M. Hatton, Lake Orion, Mich.

[73] Assignee: Eaton Corporation, Cleveland, Ohio

[21] Appl. No.: 09/247,409

[22] Filed: Feb. 10, 1999

[51] Int. Cl.[7] .................................................. F16K 1/226
[52] U.S. Cl. .......................................... 251/306; 137/884
[58] Field of Search ..................................... 251/305, 306, 251/175, 308, 192; 123/337; 137/884

[56] References Cited

U.S. PATENT DOCUMENTS

| | | | |
|---|---|---|---|
| 3,693,650 | 9/1972 | Macguire | 137/480 |
| 3,799,132 | 3/1974 | Macguire | 123/119 D |
| 3,990,676 | 11/1976 | Brownstein | 251/192 |
| 4,491,106 | 1/1985 | Morris | 123/337 |
| 4,510,965 | 4/1985 | Peroux et al. | 251/305 |
| 4,601,459 | 7/1986 | Verdelet | 251/306 |
| 4,899,984 | 2/1990 | Strickler et al. | 251/306 |
| 5,098,064 | 3/1992 | Daly et al. | 251/306 |
| 5,181,492 | 1/1993 | Sausner et al. | 123/337 |
| 5,454,357 | 10/1995 | Elder | 123/337 |
| 5,477,819 | 12/1995 | Kopec | 123/184.42 |
| 5,669,350 | 9/1997 | Altmann et al. | 251/306 |
| 5,979,870 | 11/1999 | Junier | 251/305 |
| 5,979,871 | 11/1999 | Forbes et al. | 251/305 |

*Primary Examiner*—Kevin Shaver
*Assistant Examiner*—Eric Keasel
*Attorney, Agent, or Firm*—Daniel S. Kalka; Roger A. Johnston

[57] ABSTRACT

A low-leakage air valve assembly 10 for an air intake manifold 16 includes a butterfly valve 12 constructed for mounting on a rotatable shaft 14. The butterfly valve 12 includes a first 32 and a second wing 34 with first elastic sealing means 36 mounted about the periphery of the first wing 32, and second elastic sealing means 40 mounted about the periphery of the second wing 34. The first elastic sealing means 32 includes a projecting lip 38 for sealingly contacting the wall of the valve manifold 16. The second elastic sealing means 40 includes a beam portion 42 for sealing contact with shoulder 28 of manifold 16. Third elastic sealing means 44 is axially positioned at each side of the passage 30 in the butterfly valve 12 and radially provided around a portion thereof. The first area 54 defined by the first sealing surface which is the first wing 32 and first elastic sealing means 36 is larger than the second area 56 defined by the second wing 34 and second elastic sealing means 40. This provides a net torque which increases the sealing force of the valve.

22 Claims, 6 Drawing Sheets

LOW-LEAKAGE AIR VALVE FOR VARIABLE AIR INTAKE SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

1. Field of the Invention

The present invention relates in general to an air valve for an air intake manifold, and more particularly to a low-leakage air valve for a variable air intake system for a plastic manifold assembly.

2. Description of the Related Art

In some internal combustion systems, it is desirable to vary an air intake runner length for optimizing engine performance during operation.

Plastic air intake manifolds with active runner systems use an air valve to shorten the air flow path at high rotations per minute (RPM) to optimize engine torque. Any leakage in these valves reduces torque. Conventional aluminum manifolds use precision-machined sealing surfaces on the butterfly plate and its mating manifold surface. Plastic manifolds use molded in finishes and have dimensional tolerances far greater than machined finishes. As such, problems can arise with leakage.

Port throttle valves are typically employed to regulate air flow to an internal combustion engine. They are also referred to as a "butterfly" valve which includes a body with a valve plate that extends across a throat or port on a rotatable shaft. A fully sealing valve is difficult to achieve because of clearances required for assembly of the many components in such air intake systems and the close tolerances.

One approach is to eliminate butterfly valves as taught in U.S. Pat. No. 5,454,357. This patent describes a sliding port valve for an internal combustion engine which is intended as an alternative to a butterfly valve in the intake system for the control of intake air.

Another approach is to rubber coat a plastic butterfly valve to make up for reduced accuracy of plastic parts. This type of valve still lacks improved sealing characteristics due to the fact that while vacuum assists the seal on one side of the butterfly valve by drawing the flexible lip down which increases the sealing force, it has a reverse effect on the opposite side where it tends to provide a less effective seal as the vacuum decreases the sealing force. Also, the shaft seal ordinarily employs a "bell-shaped" lip that compresses against the side walls. Vacuum leaks past the initial seal into the bell where it then aids the seal by increasing the sealing force on the atmospheric side of the bell.

There still exists a need for an improved low-leakage air valve for an air intake manifold. Such a valve would offer the advantages of a butterfly valve including the ability to have a rubber coating or an elastomeric outer seal and still effectively provide an increased sealing force particularly when applied to plastic parts.

BRIEF SUMMARY OF THE INVENTION

The present invention is directed to solving the aforementioned problems with the prior art as well as others by providing a low-leakage air valve for an air intake manifold. The present invention provides a butterfly valve constructed for mounting on a rotatable shaft. Preferably, the butterfly valve is substantially rectangular and has a passage fairly centrally axially located therethrough. The passage has a diameter substantially corresponding to that of the rotatable shaft. The butterfly valve includes a first and second wing situated on each side of the passage. Each of the wings includes a periphery constructed to sealingly contact a wall of a port in a valve housing for providing a sealing fit therein. First elastic sealing means is mounted on the periphery of the first wing of the butterfly valve for providing a fairly low-leakage air seal. The first elastic sealing means is constructed of a rubber or elastic material and includes a projecting lip that is self-sealing against a shelf within the port of the valve housing when acted upon by a vacuum. A second elastic sealing means is mounted on the periphery of the second wing of the butterfly valve for providing a fairly low-leakage air seal. The second elastic sealing means is constructed of a rubber or elastic material and includes a beam portion for bending upon contact with the shoulder situated within the port of the valve housing. Third elastic sealing means are axially positioned on each side of the passage in the butterfly valve and are radially provided around a selected portion of the rotatable shaft for providing a sliding seal between the ports of the valve housing. Preferably, the third sealing means includes an angled sealing surface that is constructed to be in full compression when the butterfly valve is in its seated position. The third elastic sealing means may further contain a ridge on the angled sealing surface thereof to increase its sealing force. Similarly, a ridge or plurality of ridges may be provided on the beam portion of the second elastic sealing means for increasing its sealing force. In the preferred embodiment, a first area defined by the first wing of the butterfly valve and the first elastic sealing means mounted on the periphery thereof is somewhat greater than the second area defined by the second wing of the butterfly valve and the second elastic sealing means mounted on the periphery thereof. This provides a net torque due to vacuum which aids the sealing of the beam portion.

The present invention is also directed to a low leakage manifold operable with at least one butterfly valve for an air intake manifold. The manifold includes at least one port with a shelf on one side of the port and a shoulder on the other side. Sealing means are provided around the upper portion of the port selectively on the shelf and the shoulder. The manifold preferably includes a channel for accommodating the shaft with the butterfly valve.

Accordingly, one object of the present invention is to provide a low-leakage air valve for an air intake manifold.

Another object of the present invention is to provide an improved low leakage manifold for an air valve assembly.

Another object of the present invention is directed to a low-leakage air valve assembly for an air intake manifold.

Still another object of the present invention is directed to a method for making a low-leakage air valve assembly for an air intake manifold.

Yet a further object of the present invention is directed to a low-leakage air valve that is rugged in construction, economical to manufacture, and durable in use.

The various features of novelty which characterize the present invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the present invention is illustrated.

DETAILED DESCRIPTION OF THE INVENTION

Figure 1:
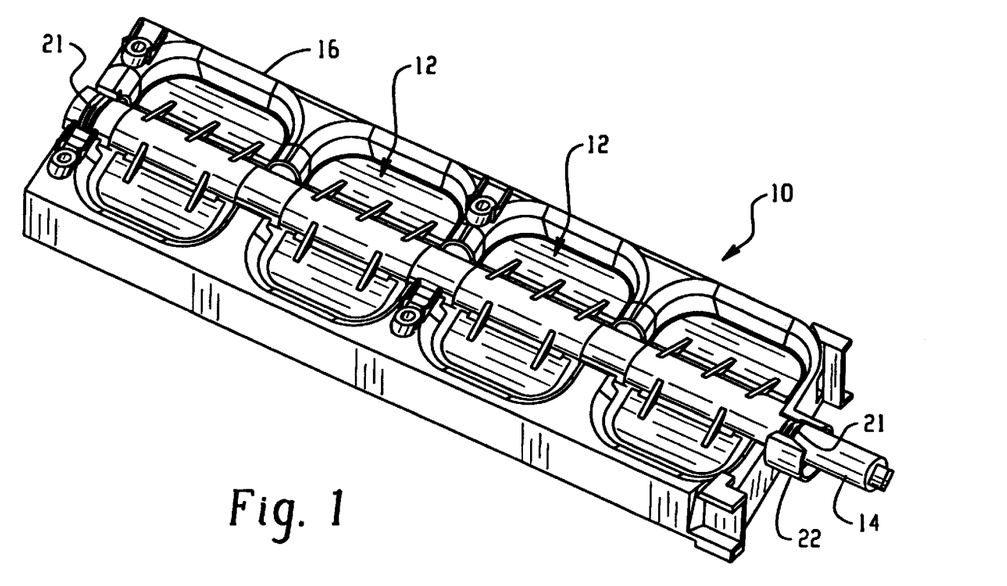
FIG. 1 is an elevated perspective view of a low-leakage air valve assembly in accordance with the present invention.

Referring to the Figures where like numerals designate like or similar features throughout the several views, and first to FIG. 1, there is shown a low-leakage air valve assembly generally designated 10 in accordance with the present invention. Low-leakage air valve assembly 10 is intended for use preferably with a plastic air intake manifold with an active runner system. The air valve shortens the air flow path at high RPMs to optimize engine torque.

Figure 2:
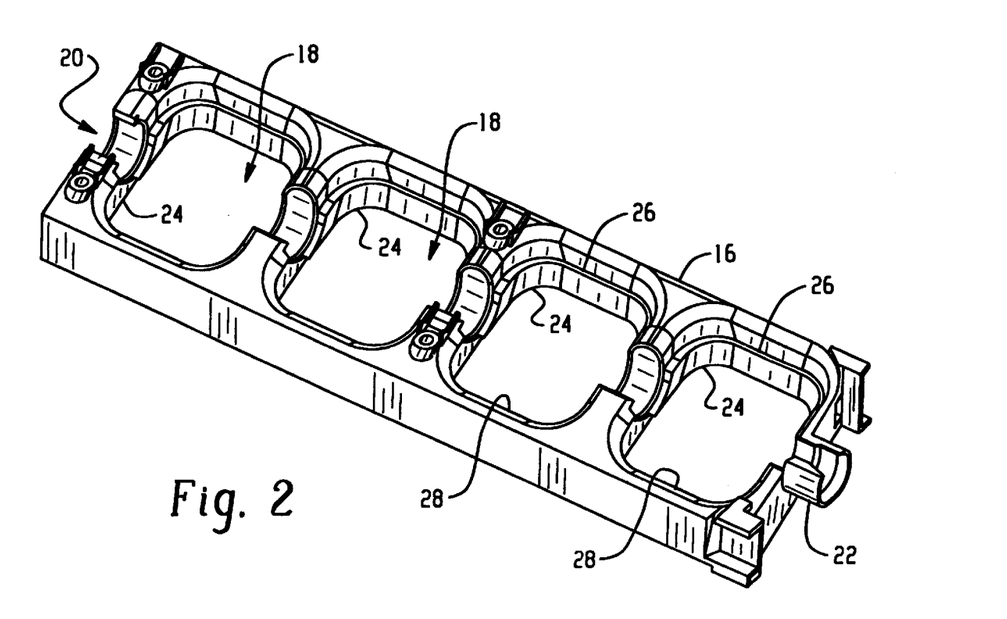
FIG. 2 is an elevated perspective view of the manifold without the butterfly valves and shaft.
Figure 3:
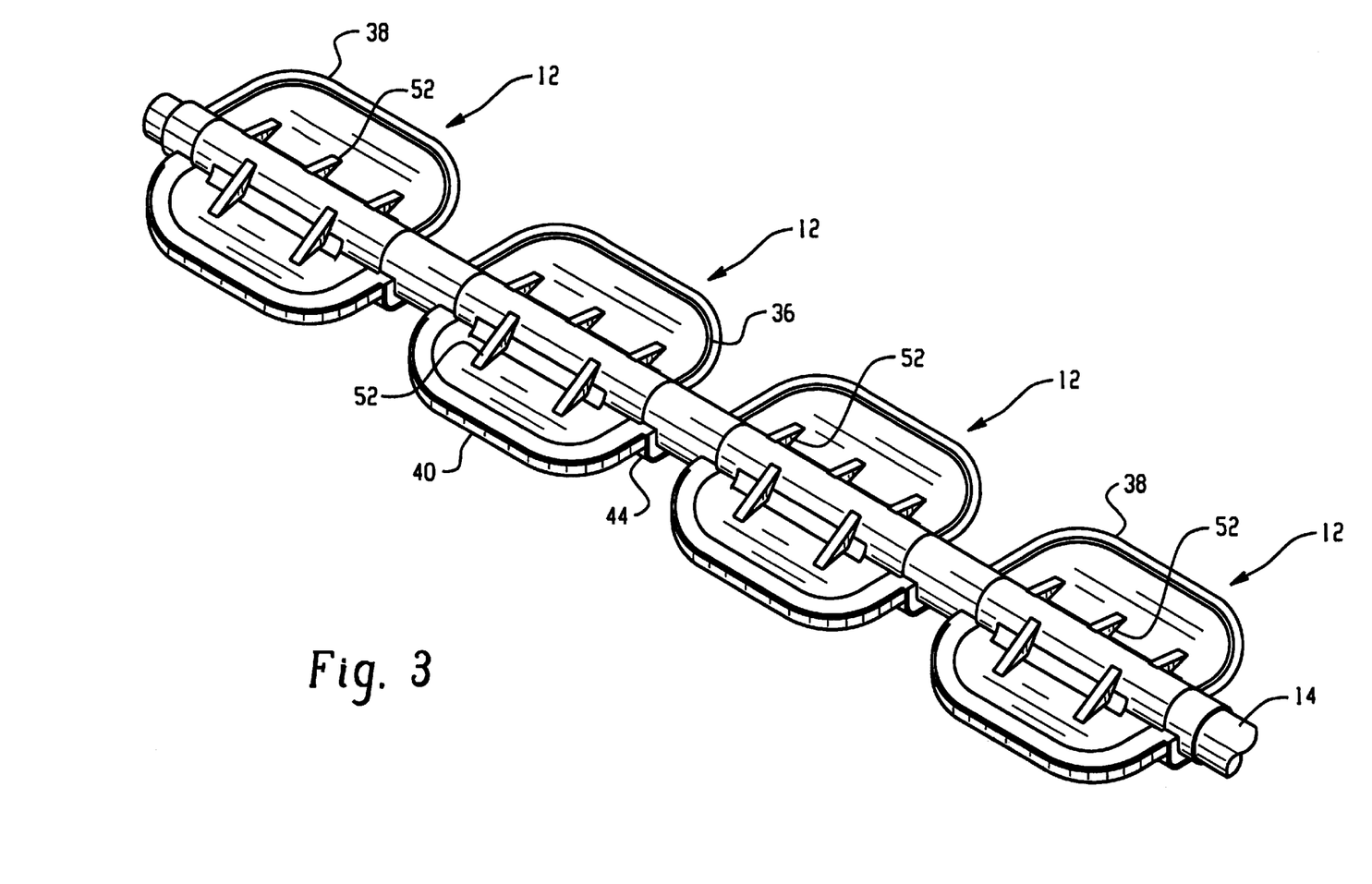
FIG. 3 is an elevated perspective view of a plurality of butterfly valves on a shaft in accordance with the present invention.
Figure 4:
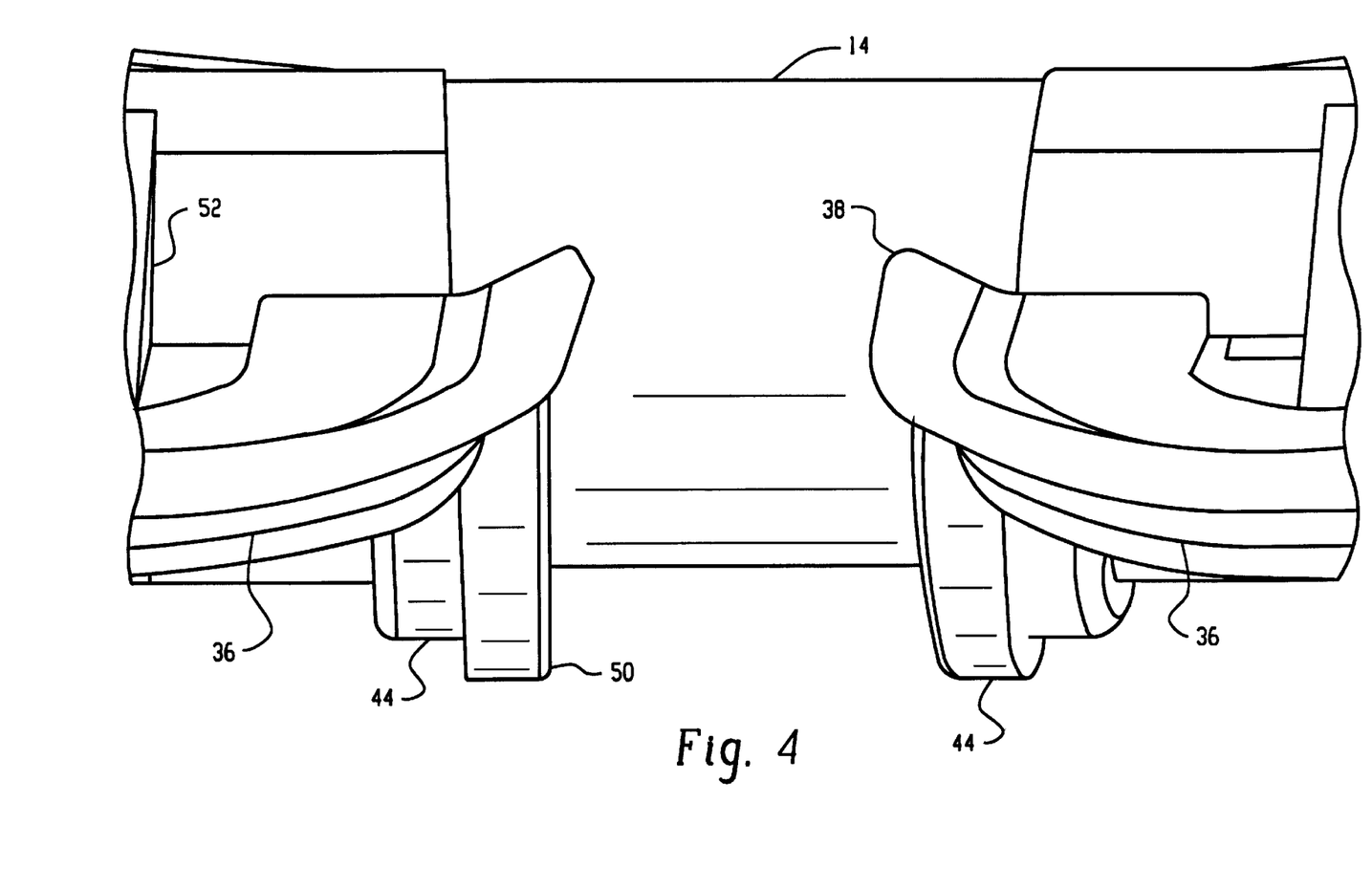
FIG. 4 is a detailed side view of a portion of FIG. 3.
Figure 6:
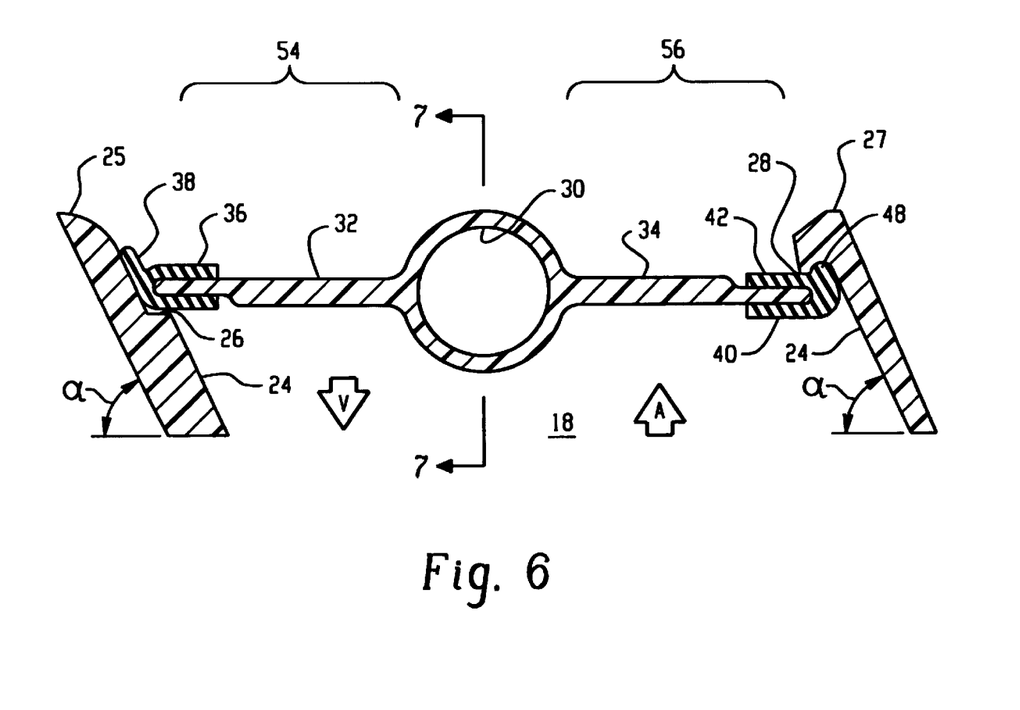
FIG. 6 is a cross-sectional view of a butterfly valve within a port in accordance with the present invention.
Figure 7:
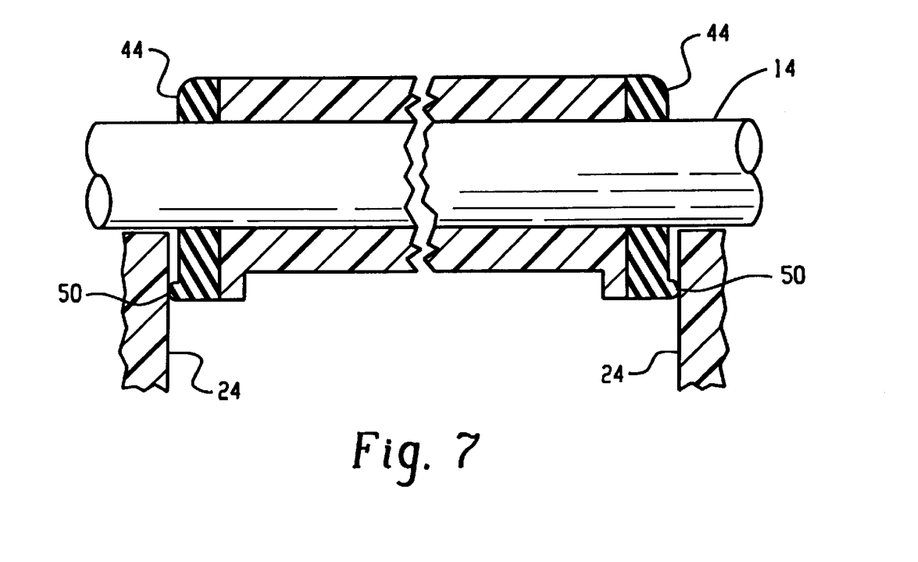
FIG. 7 is a sectional view taken at line 7—7 with a portion removed.

Low-leakage air valve assembly 10 comprises a plurality of butterfly valves 12 selectively positioned on shaft 14. Shaft 14 and butterfly valves 12 are nestingly received within air valve manifold 16. Air valve manifold 16 includes a plurality of ports 18 corresponding to the spacing of the plurality of butterfly valves 12. Channel 20 in the air valve manifold 16 receives the shaft 14 and allows butterfly valves 12 to be seated within the ports 18. Channel 20 extends in axial alignment across valve manifold 16 as best shown in FIG. 2. Preferably, valve manifold 16 includes a boss 22 which is an extension of channel 20 for receiving shaft 14. A bushing 21 made of oil impregnated bronze, powdered metal or any other suitable material may be employed within boss 22 and at the opposite end of shaft 14 to better retain shaft 14 within channel 20. In the preferred embodiment, ports 18 and side walls 24 of valve manifold 16 are at a slight angle, α, relative to normal (as shown in FIG. 6) of about 10° to about 65°, and preferably at 65°. This angle is provided for packaging or insertion in the assembly.

In the preferred embodiment, ports 18 of the valve manifold 16 are substantially square or rectangular in shape and contoured radially about their upper edge to maximize air flow in the available space. Their sides are radiused and include a shelf 26 on one side or half of the port 18 and a shoulder 28 on the other side or half of the port as shown in FIGS. 2 and 6. Shelf 26 is situated at a depth of preferably approximately one-third to one-half the depth of the port 18 and is contoured around channel 20 where it terminates at a point about midway therein. Of course, any depth sufficient to seat the valve 12 may be employed.

Shoulder 28 extends out from the top of the port 18 up to the upper edge of channel 20 preferably on one side thereof. Valve manifold 16 is constructed to receive shaft 14 with preferably four butterfly valves therein and allows shaft to partially rotate therein. The valve assembly 10 in accordance with the present invention may use as few as one valve 12 or as many as desired. Shaft 14 is constructed to rotate sufficiently within channel 20 so that the port 18 is open to its fullest extent possible.

Each butterfly valve 12 has a passage 30 axially situated therein for receiving shaft 14. Shaft 14 extending through passage 30 divides each butterfly valve 12 so as to define a first wing 32 and a second wing 34. First elastic sealing means 36 which is preferably a rubber material like silicone or HNBR (hydrogenated nitrile butadiene rubber) is mounted about the periphery of the first wing 32. The first elastic sealing means 36 includes a projecting lip 38 which is constructed to seal against contoured side wall 24 of port 18 in the valve manifold 16 when acted upon by a vacuum generally indicated as V to show the vacuum side produced in the ordinary course of an internal combustion engine's cycle. The vacuum assists the seal of the projecting lip 38 against side wall 24 when the vacuum draws the lip 38 down, as indicated by the arrow V, against shelf 26 as best seen in FIG. 6.

The second wing 34 of the butterfly valve 12 has a second elastic sealing means 40 which is preferably a rubber material like silicone or HNBR mounted thereon about its periphery. The second elastic sealing means 40 includes a beam portion 42 which is constructed to press upward against the shoulder 28 of port 18 in the valve manifold 16. As vacuum V pulls downward on, both wings the second wing 34 has a tendency to push upwards in the direction of arrow A due to the net torque created because the first wing has a larger area than the second wing. Beam portion 42 is preferably a substantially flat portion so as to produce an increased sealing force when acted upon as previously described by the vacuum and applied torque.

Figure 8:
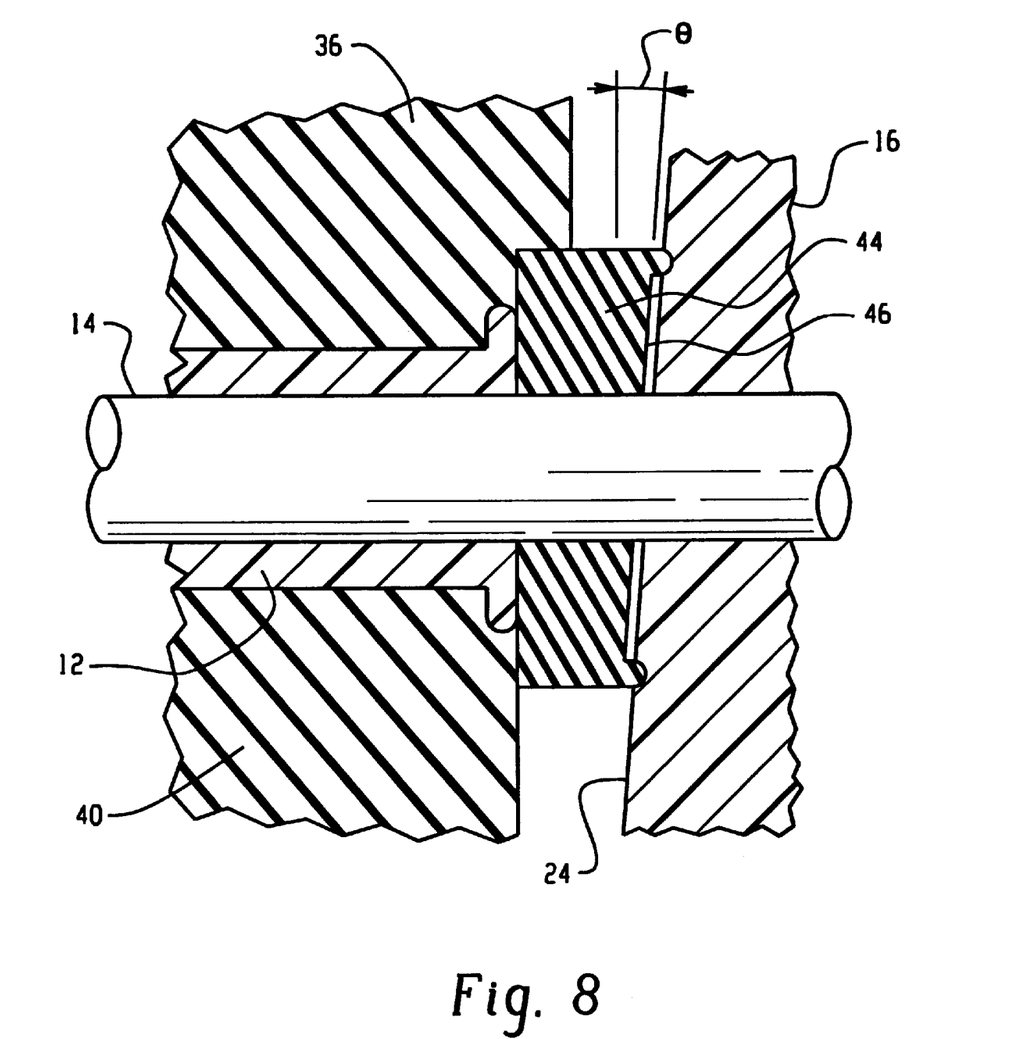
FIG. 8 is a sectional view of an axial end of valve 12.

A third elastic sealing means 44 which is also preferably a rubber material like silicone or HNBR is axially positioned at each side of the passage 30 in the butterfly valve 12 on shaft 14. Preferably, the third elastic sealing means 44 is positioned around approximately one-half of the lower side or underside of the shaft 14. In the preferred embodiment, the third elastic sealing means 44 includes an angled sealing surface 46 which provides a slight incline to generate decreasing compression of the sliding seal as the butterfly valve 12 rotates in the port 18 until a clearance ultimately exists. When the butterfly valve 12 is in the fully seated position, the third elastic sealing means 44 is in full compression. The angled sealing surface 46 is at a slight included angle as shown in FIG. 8 ranging from about 70° to about 89°, and more preferably at about 86° to the shaft. In this manner in the preferred embodiment, the sealing surface is not 90° to the shaft. This reduces friction and wear.

Figure 5:
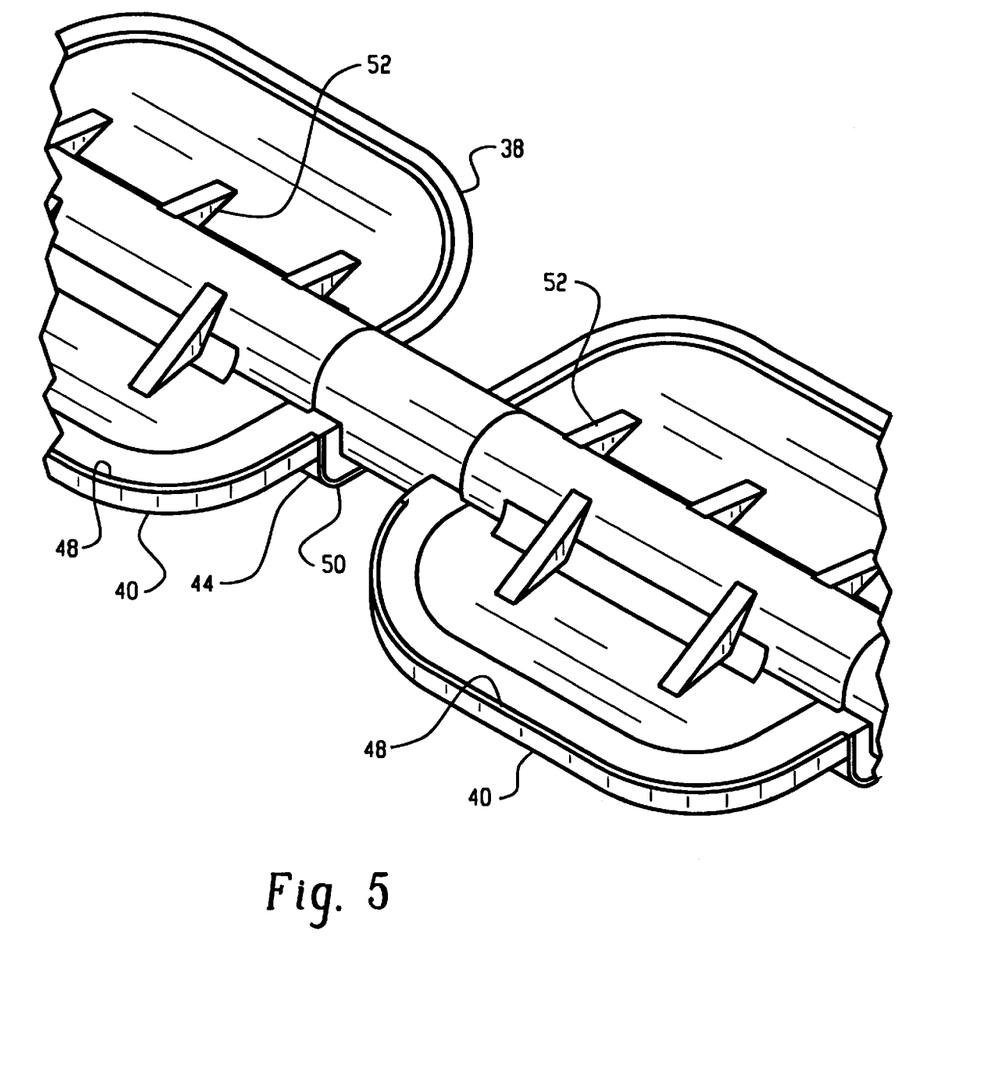
FIG. 5 is a detailed top view of a portion of FIG. 3.

The preferred embodiment of the butterfly valve 12 defines a first area 54 by the first sealing surface which is the first wing 32 and first elastic sealing means 36 including projecting lip 38 to be larger than a second area 56 defined by the second sealing surface which is the second wing 34 and second elastic sealing means 40, as illustrated in FIG. 5. This provides a net torque which increases the sealing force on the second sealing surface 56 or zone. While this torque does nothing for the first sealing surface 54 or zone as the rotation of the valve 12 is stopped, it does increase the sealing force in the second sealing zone 56. This provides the advantage of reducing the actuator torque requirement. The butterfly valve assembly 10 of the present invention cannot provide a shaft sealing surface through 360° rotation around the shaft. In other words, shaft 14 provides limited rotational movement, but sufficient to allow air to flow fully through ports 18. However, the present invention provides the advantage for a multiple valve application as well as allowing the valves to be assembled onto the shaft, and then assembled into the valve manifold 16 for a drop-in configuration.

Additional apertures may be provided in the walls of the valve manifold 16 for receiving fasteners in accommodating the drop-in configuration to readily mount into an existing air intake assembly.

To still provide even more locally high sealing stresses, a ridge 48 or even a plurality of ridges 48 of a rubber material or any other suitable elastomer are positioned on the substantially flat portion of the beam portion 42 of the second elastic sealing means 40. These ridges 48 may be progressively structured in height to reduce the pressure each bead must seal against shoulder 28. In a similar fashion, a ridge 50 or a plurality of ridges 50 may be positioned on the angled sealing surface 46 on each side of butterfly valve 12 to locally increase the sealing stresses. This results in a seal that works at lower torque, lower compression, and lower friction.

While the preferred embodiment of the present invention shows four valves 12 molded onto the shaft, it should be readily apparent to one skilled in this art that any number of valves or even a single valve may be either molded or assembled onto a shaft with keys and/or fasteners. The first, second, and third elastic sealing means can be applied thereafter. Alternatively, the elastic sealing means may be applied first to the butterfly valves 12 and then assembled on shaft 14 with fasteners or press-fit. Also, while the preferred embodiment of the present invention is particularly directed to plastic air intake manifolds with the valve manifold 16 being constructed of plastic and the butterfly valves 12 being of plastic with preferably rubber first, second, and third elastic sealing means, these items may be made from any material that provides the low-leakage feature of the present invention. An additional option which is preferred are reinforcement ribs 52 provided on both wings 32, 34 of the butterfly valve 12. Ribs 52 may be molded directly into the wings as the wings are formed. They may be formed by plastic injection molding, blow molding, or any other suitable manner.

In the present invention, there are three sealing zones that exist with the low-leakage air valve assembly 10. In particular, the first sealing zone is rather similar to any butterfly valve with the flexible projecting lip 38 providing a seal by contact with a wall of port 18 as illustrated in FIG. 6. Shelf 26 is an overtravel stop to assist in preventing damage to other seal 40. When acted upon with a vacuum, V, this increases the sealing force. The opposing or second wing 34 of butterfly valve 12 uses the smaller area and shorter second elastic sealing means 40 with its beam portion 42 to bend against shoulder 28 upon contact. This beam deflection compensates for any flatness issues and positional tolerances with respect to the valve manifold 16 and in particular the shoulder 28 therein. Ridge 48 on the beam portion 42 acts to concentrate the stress to achieve a seal with minimal applied torque since there is usually a limited quantity of torque available as actuation torque is often a function of cost. The torque is used to deflect the beam 42 and make up for the flatness and tolerance issues. The third sealing zone is between the butterfly valve 12 and the valve manifold 16 at the shaft 14 in channel 20. Other approaches in the past have used a bell-shaped, sliding seal, which increases friction and wear in this area. The design of the present invention does not employ a bell-shape nor does it require 360° sealing surfaces. The present invention employs a sliding seal with preferably a stress-concentrating bead 50 along the underside of the shaft only. In the preferred embodiment, the sealing surface is not 90° to the shaft, but rather at a slight included angle $\theta$ (preferably around 86°). The slight angled sealing surface 46 of the present invention generates a decreasing compression of the sliding seal as the butterfly valve 12 rotates until a clearance ultimately exists. The only time the third sealing zone is in full compression is when the valve 12 is in the fully seated position or closed position. Thus, friction and wear are significantly reduced and the limited torque is not wasted on sliding friction.

In the assembly of the butterfly valves 12 on shaft 14, the preferred method is to insert mold plastic onto the shaft 14, then mold rubber onto the plastic. A suitable plastic material is a glass filled nylon with a 33% glass filled nylon 6 being preferred and the preferred rubber material has a durometer range from approximately 50 to 60 URO such as silicone with a 50 URO preferred. A fluorosilicone material is also preferable, but is more expensive. Of course, the present invention is not intended to be limited to these specific materials. Suitable materials allow for an operable temperature range of about—40° C. to about 150° C., and include, without limitation, a thermosetting material for the plastic.

An alternative process may include a two step molding process where the plastic is a thermoplastic elastomer (also a suitable plastic material) molded on the shaft to form the plastic butterfly valves. Of course, the temperature limits, hardness limits, fluid compatibility limits of the rubber material should be compatible with the thermoplastic elastomer.

Still another alternative process is to assemble individual butterfly valves on a D-shaped shaft. If the butterfly valves are allowed to "float" or move in a somewhat limited manner axially, this can help tolerance issues involving positioning of the butterfly valves over the passages. In this manner, the valves would be self-centering. This reduces the amount of rubber material necessary for accommodating dimensional issues.

In the present invention, the plastic material and rubber material can connect all of the butterfly valves as a thin film along the shaft. This is to prevent plastic flash (or plastic leakage during the molding process) due to a bent shaft or differences in the size of the shaft, and rubber flash.

When a softer plastic material is used for the butterfly valves, rubber shut-off can be effected on the shaft and the softer plastic, because the mold slightly crushes the plastic if needed.

In the above manner, the present invention provides a low-leakage air valve suitable for use in variable intake system plastic manifold assemblies or in any air intake manifold.

Alternatively, the present invention comprises a manifold 16 with at least one port 18. Port 18 includes a shelf 26 and shoulder 28 similar to that depicted in FIG. 2 and described above. In the embodiment, the sealing means are provided as a minimum on the shelf 26 and shoulder 28. Preferably, the sealing means is a rubber material similar to that previously described. The sealing means may be provided to any extent desired on the side walls 24 of port 18 from shelf 26 up to and including the radiused uppermost portion 25 of port 18 and in a similar manner around the shoulder 28 to its uppermost portion 27 as best shown in FIG. 6.

While specific embodiments of the invention have been shown and described in detail to illustrate the application and the principles of the invention, it will be understood that the invention may be embodied otherwise without departing from such principles.

I claim:

1. A low-leakage air valve assembly for an air intake manifold, comprising:
   a valve manifold, said valve manifold having a plurality of ports therethrough, each port being defined by a perimeter having a shoulder on one side thereof and a shelf on an opposite side wall contoured radially about an upper edge thereof, said valve manifold including a channel extending axially across said valve manifold;
   a shaft constructed for mounting in said channel of said valve manifold; and
   a plurality of butterfly valves selectively spaced on said shaft to provide one butterfly valve for each port, each butterfly valve having a passage fairly centrally axially located therethrough for receiving said shaft therein, each butterfly valve having a first and second wing on each side of said passage, each of said wings having a periphery constructed to sealingly contact the perimeter of the port in the valve manifold for providing a sealing fit of said butterfly valve within the port in the valve manifold, said first wing of said butterfly valve having first elastic sealing means mounted on the periphery thereof for providing a fairly low-leakage air seal within the valve manifold, each of said first elastic sealing means being constructed of an elastic material and including a projecting lip that is self-sealing against the radially contoured side wall having the shelf in the valve manifold when acted upon by a vacuum, said second wing of said butterfly valve further having second elastic sealing means mounted on the periphery for providing a fairly low-leakage air seal, said second sealing means being constructed of an elastic material and including a beam portion for bending upon contact with the shoulder in the port in the valve manifold, each butterfly valve further including third elastic sealing means axially positioned at each side of said passage and radially provided to a predetermined extent thereabout for sealing said butterfly valve axially during rotation of the shaft.

2. A low-leakage air valve assembly as recited in claim 1, wherein said third elastic sealing means includes an angled sealing surface constructed to be in full compression when a corresponding valve is in a seated position.

3. A low-leakage air valve assembly as recited in claim 2, wherein said third elastic sealing means further comprises a ridge on the angled sealing surface thereof only on an underside of the butterfly valve.

4. A low-leakage air valve assembly as recited in claim 2, wherein said angled sealing surfaces is at an included angle relative to the shaft.

5. A low-leakage air valve assembly as recited in claim 2, wherein said third elastic sealing means further comprises a plurality of ridges on the angled sealing surface.

6. A low-leakage air valve assembly as recited in claim 1, wherein said beam portions of said second elastic sealing means further comprises a substantially flat portion only on an upper side of the butterfly valve.

7. A low-leakage air valve assembly as recited in claim 6, further comprising a ridge on said substantially flat portion of said second elastic means for increasing sealing stresses.

8. A low-leakage air valve assembly as recited in claim 6, further comprising a plurality of ridges on said substantially flat portion of said second elastic sealing means for increasing sealing stresses.

9. A low-leakage air valve assembly as recited in claim 1, wherein each of said butterfly valve further comprises reinforcement ribs on both sides thereof.

10. A low-leakage air valve assembly as recited in claim 1, wherein each port of said valve manifold is positioned at a slight angle relative to normal.

11. A low-leakage air valve assembly as recited in claim 10, wherein said angle ranges from about 10° to about 65°.

12. A low-leakage air valve assembly as recited in claim 11, wherein said angle is about 65°.

13. A low-leakage air valve assembly as recited in claim 1, wherein each port is substantially rectangular in shape.

14. A low-leakage air valve assembly as recited in claim 13, wherein each port has radially contoured side walls.

15. A low-leakage air valve assembly as recited in claim 1, wherein a first area defined by said first wing of said butterfly valve and said first elastic sealing means mounted on the periphery thereof is greater than a second area defined by said second wing of said butterfly valve and said second elastic sealing means mounted on the periphery thereof.

16. A low-leakage air valve assembly for an air intake manifold, comprising:
   a valve manifold having a plurality of ports therethrough with a channel extending across said valve manifold;
   a shaft constructed for mounting within said channel of said valve manifold and rotation therein; and
   a plurality of butterfly valves selectively spaced on said shaft to provide one butterfly valve for each port, each of said butterfly valves having a first and second wing with a first and second elastic sealing means mounted on a periphery of the first and second wings respectively, each butterfly valve further including third elastic sealing means axially positioned at each side of said butterfly valve and radially provided to a predetermined extent thereabout for sealing said butterfly valve axially with said respective port during rotation of the shaft.

17. A low-leakage air valve assembly as recited in claim 16, wherein said third elastic sealing means is positioned around about one-half of a lower side of said shaft.

18. A low-leakage air valve assembly as recited in claim 16, wherein said third elastic sealing means includes an angled sealing surface.

19. A low-leakage air valve assembly as recited in claim 16, wherein said first, second, and third elastic sealing means are formed integrally of elastic material.

20. A low-leakage air valve assembly as recited in claim 19, wherein said low-leakage air valve assembly is manufactured by a two step molding process comprising first molding plastic butterfly valves on said shaft, and then molding said first, second, and third elastic sealing means on each of said butterfly valves.

21. A low-leakage air valve assembly as recited in claim 19, wherein said low-leakage air valve assembly is manufactured by disposing plastic butterfly valves on said shaft and molding an elastomeric material thereon for said first, second, and third elastic sealing means.

22. A low-leakage air valve assembly as recited in claim 16, wherein each of said first elastic sealing means includes a projecting lip for sealing against a side wall with a shelf in each of the ports of said valve manifold.

* * * * *